United States Patent
Freitag et al.

(10) Patent No.: US 6,804,506 B1
(45) Date of Patent: Oct. 12, 2004

(54) METHOD MOBILE STATION AND RADIOCOMMUNICATION SYSTEM FOR CONTROLLING SAFETY RELATED FUNCTIONS IN COMMUNICATION HANDLING

(75) Inventors: Bernhard Freitag, Bad Hersfeld (DE); Gert Bolz, Hosenfeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/646,675

(22) PCT Filed: Feb. 10, 1999

(86) PCT No.: PCT/DE99/00362

§ 371 (c)(1),
(2), (4) Date: Sep. 19, 2000

(87) PCT Pub. No.: WO99/48318

PCT Pub. Date: Sep. 23, 1999

(30) Foreign Application Priority Data

Mar. 19, 1998 (DE) .......................................... 198 12 215

(51) Int. Cl.⁷ .......................... H04M 1/66; H04M 1/68; H04M 3/16
(52) U.S. Cl. .................. 455/411; 455/410; 455/414.1; 380/257; 380/270; 379/142.05; 379/189
(58) Field of Search .............................. 455/411, 410, 455/414.1, 516, 517; 379/142.05, 189; 380/257, 270–273, 275

(56) References Cited

U.S. PATENT DOCUMENTS

| | | | |
|---|---|---|---|
| 5,077,790 A | * 12/1991 | D'Amico et al. | ........... 380/249 |
| 5,077,791 A | * 12/1991 | Salihi | .......................... 380/270 |
| 5,115,466 A | 5/1992 | Presttun | |
| 5,282,250 A | * 1/1994 | Dent et al. | ................... 380/247 |
| 5,392,355 A | * 2/1995 | Khurana et al. | ............. 380/270 |
| 5,442,703 A | * 8/1995 | Kim et al. | .................... 380/271 |
| 5,640,680 A | * 6/1997 | Ishida et al. | ................ 340/7.28 |
| 5,689,563 A | * 11/1997 | Brown et al. | ................ 380/247 |
| 5,737,701 A | * 4/1998 | Rosenthal et al. | ........... 455/411 |
| 6,111,955 A | * 8/2000 | Mizikovsky et al. | ........ 380/278 |

FOREIGN PATENT DOCUMENTS

| | | |
|---|---|---|
| DE | 39 19 734 | 12/1990 |
| DE | 43 17 143 | 12/1994 |
| DE | 44 06 602 | 9/1995 |

(List continued on next page.)

OTHER PUBLICATIONS

Ping Lin, et al., "Security in Enterprise Networking: A quick Tour", IEEE communications Magazine, Jan. 1996, pp. 56–61.

*Primary Examiner*—William Trost
*Assistant Examiner*—Stephen D Agosta
(74) *Attorney, Agent, or Firm*—Morrison & Foerster LLP

(57) ABSTRACT

Method, mobile station and radio communications system for controlling security-related functions for call handling.

Figure 1:
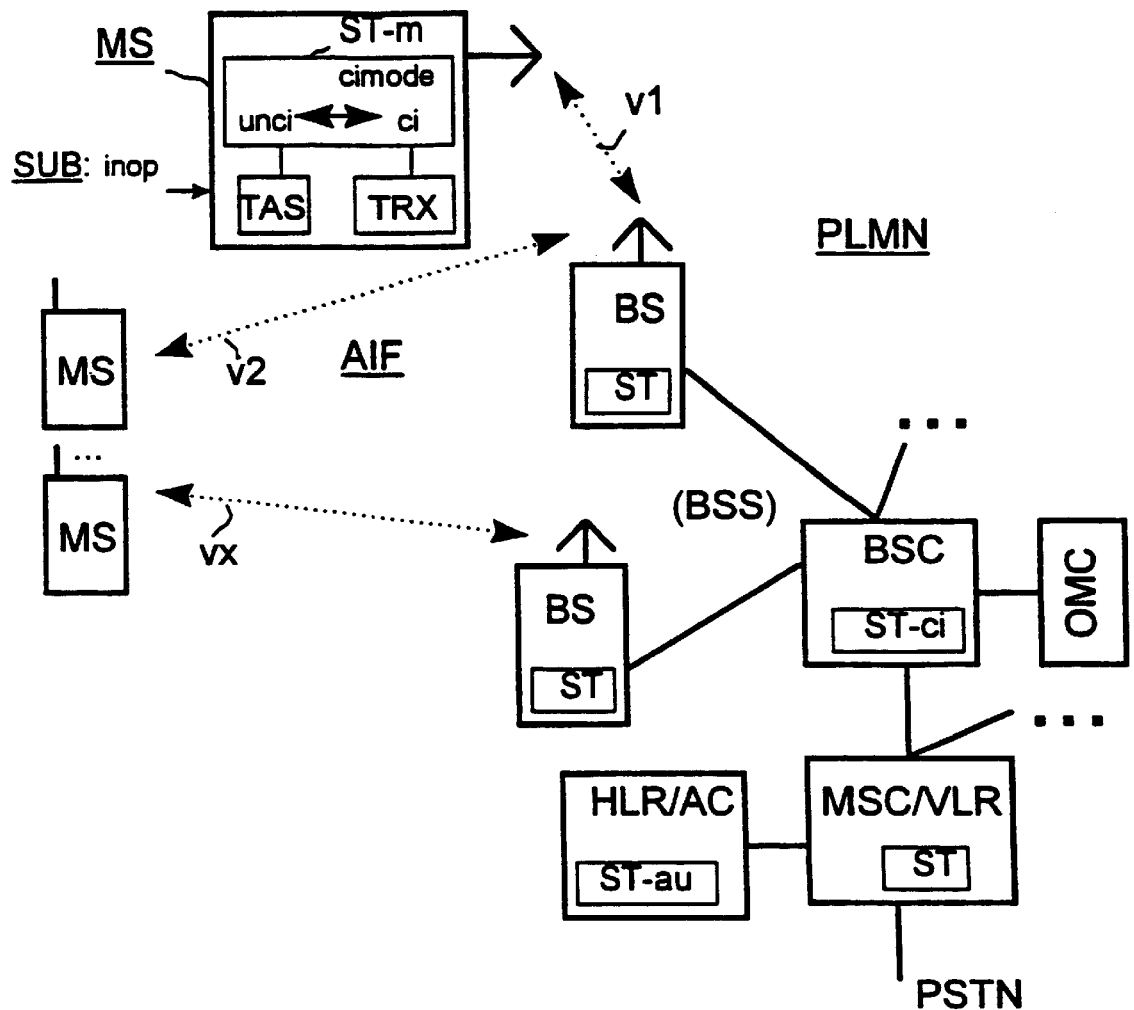

Based on the known method and radio communications system for controlling the security-related functions for call handling with subscriber authentication and secrecy of the information, a ciphering request having an identifier (cimode) is received and evaluated by the mobile station (MS) in order to determine whether the communications network wishes to have connections on the air interface (AIF) with ciphered information or with unciphered information. In this case, the mobile station (MS) can be switched under subscriber control to an operating mode in which the connection (for example v1) is terminated if the received identifier (cimode) allows connections with unciphered information. If the radio subscriber does not wish unciphered connections to be intercepted, it is possible to ensure that the information is transmitted, if required, such that it is proof against interception, under subscriber control.

5 Claims, 2 Drawing Sheets

FOREIGN PATENT DOCUMENTS

| | | | |
|---|---|---|---|
| DE | 4406602 A1 * | 9/1995 | ............ H04L/9/32 |
| DE | 195 08 461 | 12/1995 | |
| DE | 196 00 406 | 7/1996 | |
| DE | 195 08 731 | 8/1996 | |
| EP | 0 779 760 | 6/1997 | |
| EP | 0779760 A1 * | 6/1997 | ............ H04Q/7/32 |
| EP | 0 827 356 | 3/1998 | |
| WO | WO 99/14970 | 3/1999 | |

* cited by examiner

METHOD MOBILE STATION AND RADIOCOMMUNICATION SYSTEM FOR CONTROLLING SAFETY RELATED FUNCTIONS IN COMMUNICATION HANDLING

Method, mobile station and radio communications system for controlling security-related functions for call handling The invention relates to a method, a mobile station and a radio communications system for controlling security-related functions for call handling as claimed in the pre-characterizing clause of patent claims 1, 6 and 7.

Radio communications systems, such as the GSM Standard (Global System for Mobile Communication) mobile radio system, carry out information transmission using an air interface on which connections can be set up, cleared and maintained between mobile stations and network devices in a communications network. Mobile-radio-specific functions are carried out during call handling, including security-related functions such as subscriber authentication and the secrecy function. Access authorization for a radio subscriber to the communications network is checked by means of the subscriber authentication process which is normally started when a connection is set up between a mobile station and the communications network. The secrecy function is based on ciphering the information to be transmitted via the air interface—in particular the user information. A ciphering procedure is initiated at the network end by sending a ciphering request to the mobile station, to which the mobile-station end responds by transmitting information which has already been ciphered. The security-related functions for the GSM Standard radio communications system are described, for example, in "Netzübersicht GSM" [GSM network overview], Siemens AG, 1995, Chapter 3.4.2, pages 114 et seq.

The above procedure is based on the principle that the mobile station trusts the communications network, that is to say the security-related functions cannot be influenced by it. For connections which arrive at or originate from a mobile station, this means that deliberate interception is possible, for example by means of special intervention in the air interface, see the prior Patent Application P 19749388.2—without the mobile station being able to prevent this. In the case of the solution according to the prior patent application, the mobile station is, specifically, forced to set up an unciphered connection.

The invention is based on the object of specifying a method, a radio communications system and a mobile station of the type mentioned in the introduction, by means of which it is reliably possible to prevent interception of connections on the air interface.

This object is achieved according to the invention by the method having the features of patent claim 1, the radio communications system having the features of patent claim 6, and the by the mobile station having the features of patent claim 7. Advantageous developments of the invention can be found in the dependent claims.

Based on the known method and radio communications system for controlling the security-related functions for call handling with subscriber authentication and secrecy of the information, the ciphering request having an identifier is received and evaluated by the mobile station in order to determine whether the communications network wishes to have connections on the air interface with ciphered information or with unciphered information. In this case, the mobile station can be switched under subscriber control to an operating mode in which the connection is terminated if the received identifier allows connections with unciphered information.

The mobile station according to the subject matter of the invention comprises a control unit for evaluation of an identifier which is sent by the communications network and indicates whether the communications network wishes to have connections on the air interface with ciphered information or with unciphered information. Furthermore, the mobile station can be switched under subscriber control to an operating mode in which the control unit allows termination of the connection if the received identifier allows connections with unciphered information. The invention ensures that the connections on the air interface contain only ciphered information, otherwise termination of the connection from the mobile station end is threatened. In consequence, the mobile station has the capability to suppress or avoid interception of connections with unciphered information, under subscriber control, and thus no longer needs to leave it to the communications network to allow unciphered information transmission and to initiate corresponding connections.

One advantageous development of the invention provides for a message to clear the connection to be sent by the mobile station via the air interface to the communications network. The transmission of a clear message means that the communications network is informed directly and immediately of the termination of the connection by the mobile station.

One alternative development of the invention provides for the transmitting/receiving unit for transmitting and receiving radio signals to be temporarily switched off by the mobile station in order to signal to the communications network that the connection has been terminated.

One particularly simple, but very effective and user-friendly, option for switching the mobile station under subscriber control to the operating mode is for a special station key to be provided on the mobile station.

A development of the invention as an alternative to or in addition to this provides for the mobile station to be switched under subscriber control to the operating mode by means of input operations—preferably under menu control.

Figure 2:
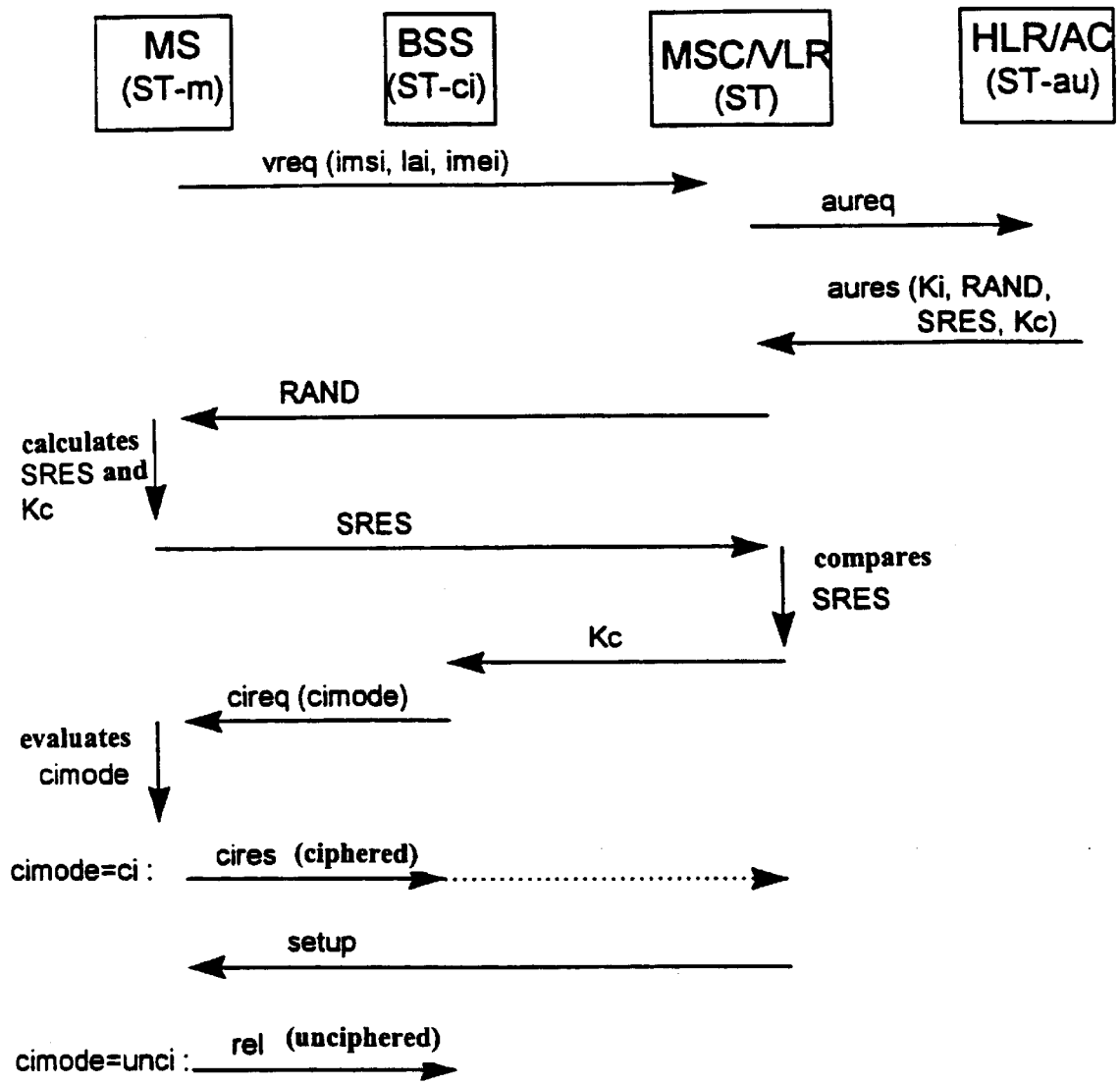

The invention will be explained in more detail in the following text using an exemplary embodiment and with reference to drawing illustrations, in which FIG. 1 shows the block diagram of a radio communications system for controlling security-related functions, according to the invention, and FIG. 2 shows the message flow for controlling the security-related functions between a mobile station and network devices in a communications network.

The structure of the radio communications system illustrated in FIG. 1 corresponds to that of a known GSM system using a TDMA multiple-access method (Time Division Multiple Access) on an air interface AIF for connecting mobile stations MS to network devices in a communications network PLMN. However, the invention can also be applied to other radio communications systems which use other multiple access methods—for example having a CDMA component—or have a different network layout. A number of connections v1, v2 . . . vx between moving mobile stations MS and fixed-position base stations BS in the communications network PLMN run on the air interface AIF of the radio communications system. Such a base station BS is a radio station which is arranged to cover a radio area—for example a radio cell—in order to be able to set up, clear and maintain the connections via the air interface AIF from/to the mobile stations MS which are located in its radio area. In the present example, it is assumed that the connections of v1 and v2 are managed by a base station BS, and the connection vx is managed by another base station BS. The connections may be both outgoing and incoming connections. Each base station BS is connected to a base station controller BSC, the number of which may vary depending on the radio coverage of the communications network. Base stations BS and base station controllers BSC form the base station system BSS responsible for the radio functions.

The communications network PLMN, furthermore, also has switching devices, the mobile switching centers MSC/VLR, which are networked with one another and provide access to another communications system, for example a public switched telephone network PSTN. In this case, the mobile switching center MSC/VLR is assigned a local subscriber database, the visitor location register VLR, for storing subscriber data for radio subscribers located in its responsibility area. The mobile switching center MSC/VLR is connected to the base station controller BSC. The communications network PLMN furthermore contains at least one central subscriber database, the home location register HLR, for storing subscriber data for all the radio subscribers registered in the communications network. An authentication center AC is connected to the home location register. An operations and maintenance center OMC provides control and maintenance functions in the radio communications system, or for parts of it.

The security-related functions for call handling comprise subscriber authentication including the authentication center AC as well as secrecy of the information for transmission via the air interface AIF, including the base station system BSS. As is known, the subscriber authentication is used to check the access authorization of the radio subscriber to the communications network PLMN, while the ciphering process means that information interchanged on the transmission channels, in particular user information, is not available to unauthorized third parties—for example by interception of the call. Each network device normally has a controller ST. In this case, a control unit ST-ci in the base station system BSS—for example in the base station controller BSC—carries out the functions of the ciphering procedure at the network end, and a control unit ST-au in the authentication center AC carries out the functions of the authentication procedure.

The mobile station MS also has devices for supporting security-related functions. For example, as is known, it has a subscriber module—for example a SIM card—for storing an individual subscriber key and algorithms for calculating security parameters. Furthermore, it has a control unit ST-m, a transmitting/receiving unit TRX for transmitting and receiving radio signals via the air interface AIF, and input means for use of the terminal comprise station keys—for example for inputing alphanumeric characters and operations. A special station key TAS can be operated—that is to say under subscriber control—so that the control unit ST-m according to the invention can switch the mobile station MS to an operating mode in which the connection v1 to the base station BS can be terminated. This is the case when an identifier cimode which is received by the base station system BSS, and is also sent in a network-end ciphering request, indicates that the connection v1 is being used with unciphered information. To this end, the control unit ST-m evaluates the arriving identifier cimode, which contains either an index ci (ciphered)—equivalent to the network-end desire for ciphered information transmission—or an index unci (unciphered)—equivalent to the network-end desire for unciphered information transmission.

A solution for subscriber-controlled switching to the operating mode, as an alternative to operation of the special station key TAS, and in which only connections with ciphered information are allowed, is for the radio subscriber SUB to carry out specific input operations inop—preferably under menu control, for example using function keys on the mobile station MS. In order to terminate the setting-up of the connection v1, the control unit ST-m in the mobile station MS preferably generates a clear message, which is sent to the base station system BSS in order to signal to the communications network PLMN that the connection v1 has not been made. This message may be produced in ciphered form—using a cipher code contained in the mobile station—or in unciphered form. As an alternative to sending a specific message, the transmitting/receiving unit TRX can also be temporarily switched off by the control unit ST-m in the mobile station MS in order to terminate the connection v1.

The invention ensures that the connections v1, v2, vx . . . on the air interface AIF contain only ciphered information, otherwise the mobile station threatens to terminate the respective connection. In consequence, the mobile station MS has the capability to suppress or to prevent interception of connections with unciphered information, under subscriber control, and thus no longer needs to leave it to the communications network to allow this unciphered information transmission and to initiate corresponding connections which can be intercepted by third parties. If the mobile station is in the unci operating mode and the radio subscriber also allows unciphered information transmission via connections provided by the communications network PLMN, corresponding unciphered connections can also be set up on the air interface AIF.

FIG. 2 shows a schematic illustration of the message flow for controlling the security-related functions in the radio communications system shown in FIG. 1. The devices involved with the message flow are the mobile station MS with the control unit ST-m, the base station system BSS with the control unit ST-ci, the mobile switching center MSC/VLR with the control unit ST, and the home location register HLR and authentication center AC with the control unit ST-au. The control unit ST-m produces a message vreq to set up a connection—for example for location registration, for interchanging short messages, for a "location update" when changing the supply area by means of a different visitor location register VLR etc.—and sends this on a control channel—for example BCCH control channel (broadcast control channel)—to the mobile switching center MSC/VLR. The request vreq contains a subscriber identity imsi, location information lai and equipment identifier imei. The visitor location register VLR then initiates the authentication process by sending an authentication request aureq to the home location register HLR and authentication center AC. If the visitor location register VLR does not yet know the subscriber data, it uses this data to request the security parameters (triplets) from the home location register HLR, as well. The home location register HLR retrieves the requested security parameters from the authentication center AC and sends them back together with the subscriber data in an authentication response aures in the opposite direction. The security parameters comprise a random number RAND, an individual subscriber key Ki, an authentication response SRES (signed response) and a cipher code Kc.

The mobile switching center MSC/VLR sends the random number RAND to the terminal via that base station in the base station system BSS which is responsible for the mobile station MS at the network end. The mobile station MS or its control unit ST-m for its part calculates the authentication response SRES using an algorithm, which can be specified in advance, from the transmitted random number RAND and the subscriber key stored in the subscriber module.

Furthermore, it determines the cipher code Kc using a different algorithm and the parameters mentioned above. It then sends the calculated authentication response SRES to the visitor location register VLR for comparison with the authentication response SRES stored at the network end. If the comparison indicates that the responses SRES are identical, the subscriber authentication has been successful, otherwise an entry can be made in a security file in the visitor location register VLR. Based on the authentication process having been successfully carried out, the visitor location register VLR sends the calculated cipher code Kc to the base station system BSS which is responsible for network-enciphering of the information on the air interface.

The base station system BSS generates a cipher request cireq for ciphering the information to be transmitted on the air interface in the direction of the mobile station MS, and sends the identifier cimode in it as well, to determine whether the communications network PLMN wishes to have connections on the air interface with ciphered information or with unciphered information. The identifier cimode is preferably produced by the control unit ST-ci contained in the base station controller, and is inserted in the message cireq. The received identifier cimode is evaluated by the control unit ST-m. If the mobile station MS is switched under subscriber control to the operating mode with the index ci, and the evaluation of the identifier cimode identifies only the use of connections with ciphered information, it generates a cipher response cires in which the information is transmitted, already ciphered using the code Kc, in the uplink direction to the communications network and to the mobile switching center MSC/VLR. Following the message cires, the process of the setting up the connection is continued and a connection setting-up response setup is transmitted by the mobile switching center MSC/VLR in the downlink direction to the mobile station MS.

Otherwise, if, following the evaluation of the identifier cimode, the index unci identifies the use of connections with unciphered information, the control unit ST-m in the mobile station MS generates a clear message rel. The clear message rel signals that the connection has been terminated since the received identifier cimode also allows unciphered information transmission, but the mobile station MS is in the operating mode for ciphered connections only. The radio subscriber does not wish unciphered connections to be intercepted. He has therefore switched the mobile station MS to the associated operating mode, in order to make it possible to ensure that, if required, transmission which is proof against interception is carried out under subscriber control. The clear message rel may be sent ciphered or unciphered via the air interface to the base station system BSS.

What is claimed is:

1. A method for controlling security-related functions for call handling in a radio communications system having an air interface for linking a mobile station to a communications network, comprising the steps of:

initiating a call set-up by said mobile station;

checking access authorization of a radio subscriber to said communications network in a subscriber authentication process carried out between said mobile station and said communication network;

sending a ciphering request for secrecy of information on said air interface of said communications network to said mobile station, said ciphering request having an identifier to determine whether said communications network accepts connections on said air interface with ciphered information or with unciphered information;

evaluating said sent ciphering request which was received by said mobile station, said mobile station being switchable under subscriber control to an operating mode in which a connection is terminated if said received ciphering request identifier allows connections with unciphered information;

sending a message to clear said connection by said mobile station via said air interface to said communications network; and switching said mobile station under subscriber control to said operating mode utilizing input operations via a station key.

2. A method for controlling security-related functions for call handling in a radio communications system having an air interface for linking a mobile station to a communications network, comprising the steps of:

initiating a call set-up by said mobile station;

checking access authorization of a radio subscriber to said communications network in a subscriber authentication process carried out between said mobile station and said communication network;

sending a ciphering request for secrecy of information on said air interface of said communications network to said mobile station, said ciphering request having an identifier to determine whether said communications network accepts connections on said air interface with ciphered information or with unciphered information;

evaluating said sent ciphering request which was received by said mobile station, said mobile station being switchable under subscriber control to an operating mode in which a connection is terminated if said received ciphering request identifier allows connections with unciphered information;

temporarily switching off a transmitting/receiving unit that transmits and receives radio signals by said mobile station in order to terminate said connection; and switching said mobile station under subscriber control to said operating mode utilizing input operations via a station key.

3. A radio communications system for controlling security-related functions for call handling, comprising:

an air interface for linking a mobile station to a communications network;

network devices for carrying out subscriber authentication for checking access authorization of a radio subscriber to said communications network as soon as the setting-up of a call is initiated by said mobile station;

network devices for sending a ciphering request for secrecy of information on said air interface to said mobile station, said network devices for sending a ciphering request having a control unit for insertion of an identifier into said ciphering request to determine whether said communications network accepts connections on said air interface with ciphered information or with unciphered information, said mobile station sends a message to clear said connection via said air interface to said communications network, and said mobile station has a control unit for evaluation of a received said identifier, said mobile station being switchable under subscriber control via input operations by a station key to an operating mode in which said mobile station control unit allows termination of a connection when said received identifier allows connections with unciphered information.

4. A mobile station for controlling security-related functions for call handling in a radio communications system, comprising:

an air interface;

a mobile station;

a communications network, said air interface linking said mobile station to said communication network, said communications network comprising:

network devices for carrying out subscriber authentication for checking access authorization of a radio subscriber to said communications network as soon as a setting-up of a call is initiated by said mobile station, and network devices for sending a ciphering request for secrecy of information on the air interface to the mobile station;

said mobile station further comprising a control unit for evaluation of an identifier which is sent from said communications network and indicates whether said communications network accepts connections on said air interface with ciphered information or with unciphered information, said mobile station being switchable switched under subscriber control to an operating mode in which said control unit allows termination of a connection when a received said identifier allows connections with unciphered information; and a separate station key, whose operation allows said mobile station to be switched to said operating mode, under subscriber control, wherein said control unit in said mobile station produces a message to clear said connection, and sends this message via said air interface to said communications network.

5. The mobile station as claimed in claim 4, wherein:

said control unit in said mobile station produces a message to clear said connection, and sends this message via said air interface to said communications network.

\* \* \* \* \*